(12) United States Patent
Robertson et al.

(10) Patent No.: US 9,594,623 B2
(45) Date of Patent: Mar. 14, 2017

(54) SYSTEM ON CHIP AND METHOD OF UPDATING PROGRAM CODE ON A SYSTEM ON CHIP

(71) Applicant: FREESCALE SEMICONDUCTOR, INC., Austin, TX (US)

(72) Inventors: Alistair Paul Robertson, Glasgow (GB); Ray Charles Marshall, Harpenden (GB); Robert F. Moran, Largs (GB); Murray Douglas Stewart, Johnstone (GB)

(73) Assignee: NXP USA, INC., Austin, TX (US)

( * ) Notice: Subject to any disclaimer, the term of this patent is extended or adjusted under 35 U.S.C. 154(b) by 100 days.

(21) Appl. No.: 14/666,592

(22) Filed: Mar. 24, 2015

(65) Prior Publication Data

US 2016/0283313 A1 Sep. 29, 2016

(51) Int. Cl.
*G06F 11/00* (2006.01)
*G06F 11/07* (2006.01)
*G06F 3/06* (2006.01)

(52) U.S. Cl.
CPC ........ *G06F 11/0793* (2013.01); *G06F 3/0619* (2013.01); *G06F 3/0629* (2013.01); *G06F 3/0673* (2013.01); *G06F 11/073* (2013.01)

(58) Field of Classification Search
CPC ............................ G06F 11/0793; G06F 11/073
USPC .............. 714/15, 16, 2, 20, 30–35, 733–734
See application file for complete search history.

(56) References Cited

U.S. PATENT DOCUMENTS

| 7,657,702 | B2 | 2/2010 | Conley | |
|---|---|---|---|---|
| 7,770,166 | B2* | 8/2010 | Oh | G06F 11/1433 717/174 |
| 7,949,931 | B2* | 5/2011 | Lastras-Montano | G06F 11/1044 714/768 |
| 8,122,184 | B2* | 2/2012 | Huang | G06F 12/0246 711/103 |
| 8,707,110 | B1* | 4/2014 | Shaeffer | G06F 11/1004 714/52 |
| 2008/0046802 | A1* | 2/2008 | Honda | G06F 11/1044 714/805 |
| 2009/0204871 | A1* | 8/2009 | Eggleston | G06F 11/1008 714/763 |
| 2011/0271164 | A1* | 11/2011 | Ahn | G06F 11/1048 714/752 |

FOREIGN PATENT DOCUMENTS

WO 03060716 A1 7/2003

* cited by examiner

*Primary Examiner* — Dieu-Minh Le

(57) ABSTRACT

In a system on chip SoC, a memory control unit connected between the memory unit and the processing unit controls access to the memory unit. An update request received or generated by the processing unit triggers an update operation which comprises appending an update enabling record to a sequence of update records in the log region, writing new program code to the memory unit, and appending an update completion record to a sequence of update records. Write access to the log region is disabled if a fault is detected in the SoC during the update operation.

17 Claims, 6 Drawing Sheets

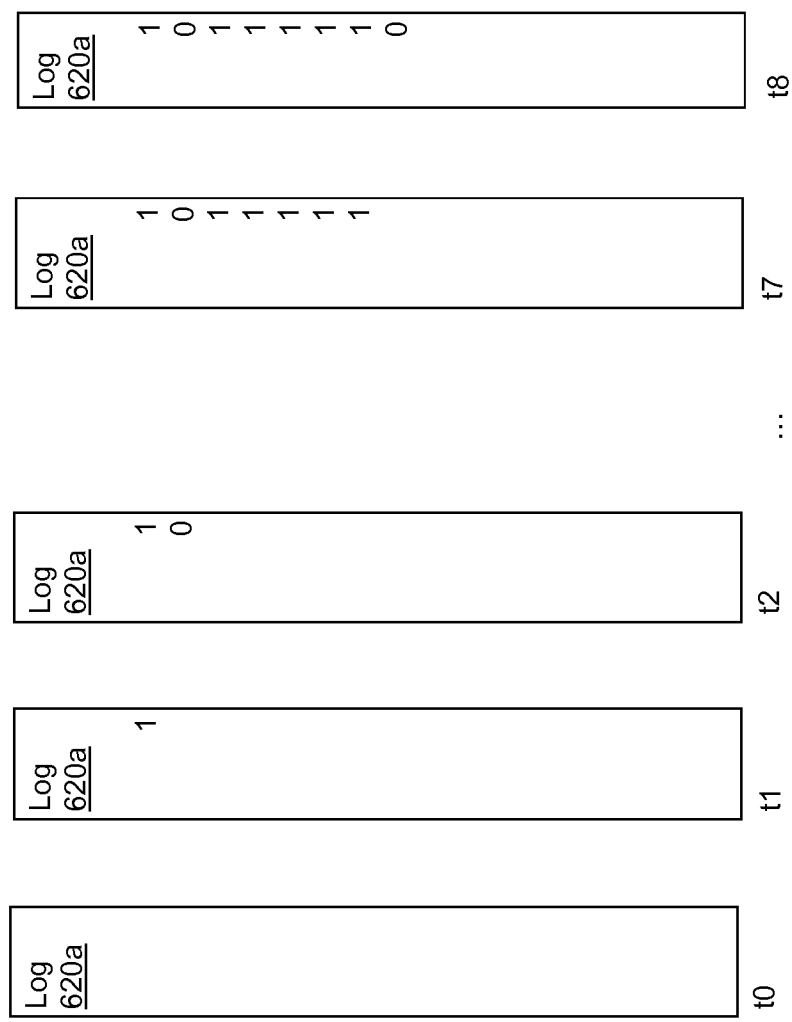

SYSTEM ON CHIP AND METHOD OF UPDATING PROGRAM CODE ON A SYSTEM ON CHIP

FIELD OF THE INVENTION

This invention relates to a system on chip and a method of updating program code on a system on chip.

BACKGROUND OF THE INVENTION

A system on chip (SoC) is a computer system implemented on a single chip. An SoC includes a processing unit connected to a memory unit and operable to execute one or more instructions stored in the memory unit. The instructions may be provided at least partly by program code residing in a programmable region of the memory unit, referred to herein as the program region.

From time to time, it may be desirable to update program code in the program region. Such updates can take the form of radio transmitted updates (e.g., over the air or "OTA" updates) to the SoC. For example, an SoC may be located in a vehicle (e.g., a motor car). Today, the connected car is becoming a reality. The connected car covers various applications, including over the air updates to vehicle electronics.

During an update to the SoC, an unexpected incident (e.g., an error) may occur on the SoC. The incident may be related or unrelated to the update in progress. The incident may be software related, hardware related, or due to specific operating conditions being outside a normal operating range. Such operating conditions may be related to power supplies, clock frequencies, or temperature, to name a few. Even when the incident is not directly related to the update in progress, it may be seen as an indicator of an increased risk that something may go wrong during the update.

Formally, various kinds of events on an SoC can be treated as faults. Faults may be logical or physical in nature. For example, a temperature sensor detecting that a temperature of the SoC is above a certain threshold may be considered a physical fault. In contrast, lack of free memory, arithmetic exceptions, or stack overflows are examples of logical errors. A fault occurring while the SoC is installing the new program code in the program region can thus be an indicator of an increased risk that new program code will not be installed correctly in the program region, even if the fault by itself does not affect the update process.

The program region may have associated with it a normal access mode in which the program code can be read and executed and an update access mode in which new code can be written to the program region. The SoC may be arranged to switch from the normal access mode to the update access mode in response to an update request and to return to the normal access mode when the update has been completed. The invention described in greater detail below is based on the insight that the SoC can be made more reliable by impeding the SoC to return to the normal access mode if a fault has occurred during the update process.

BRIEF DESCRIPTION OF THE DRAWINGS

Further details, aspects and embodiments of the invention will be described, by way of example only, with reference to the drawings. Elements in the figures are illustrated for simplicity and clarity and are not necessarily drawn to scale.

FIG. 6 schematically shows an example of a sequence of update records at different points in time.

DETAILED DESCRIPTION OF THE PREFERRED EMBODIMENTS

Figure 1:
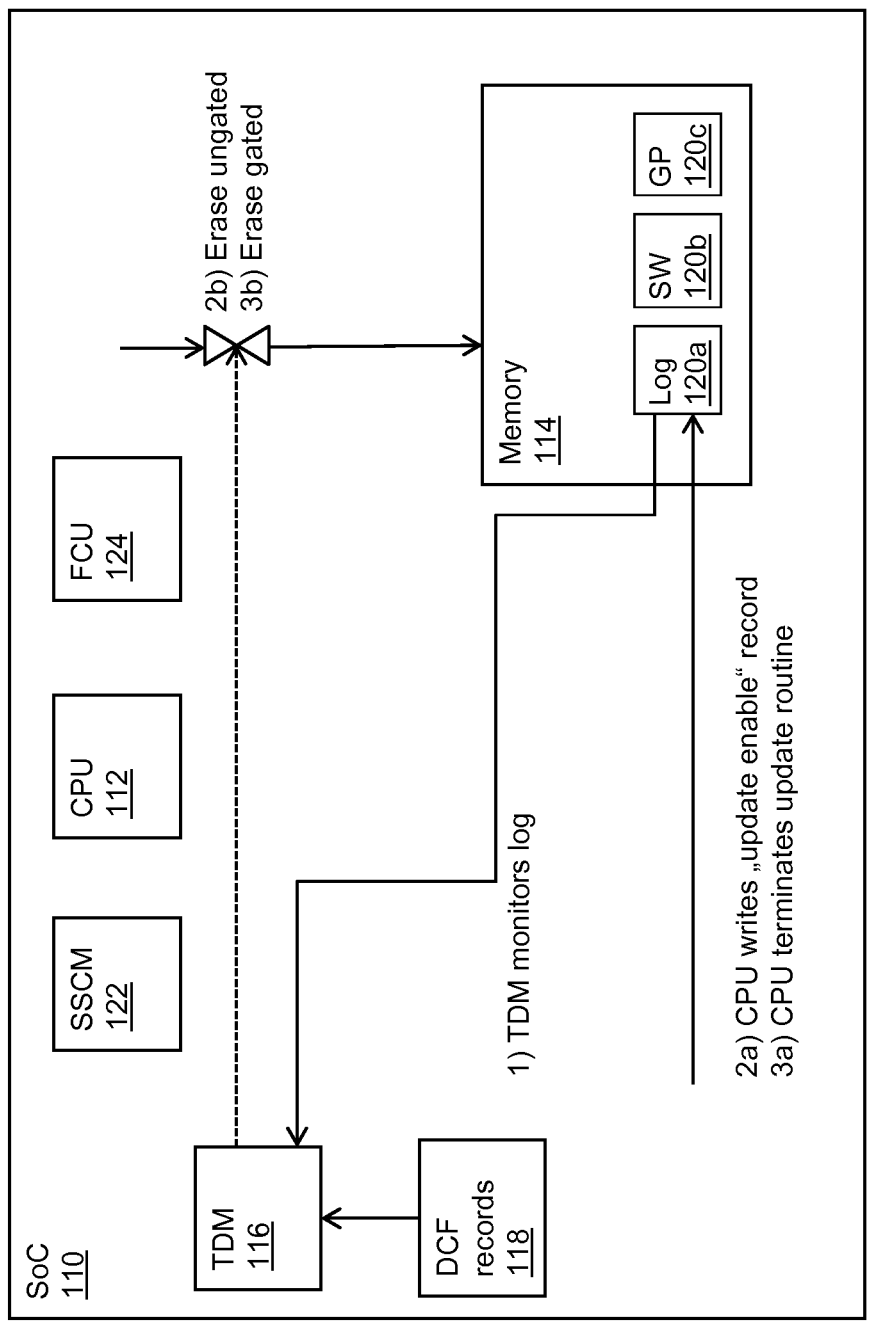
FIG. 1 schematically illustrates an example of an embodiment of an SoC.

FIG. 1 schematically illustrates an example of an SoC 110. The SoC 110 may include various features for supporting updates to program code, e.g., over the air updates. For instance, the SoC 110 may include a read while write (RWW) flash and multicore (not shown). This may permit one central processing unit (CPU) on the SoC 110 to be updating a non-volatile memory (NVM) image while another CPU can continue to support an application, thus minimizing intrusion. The SoC 110 may also include a memory management unit (MMU) capable of remapping (not shown). This may permit switching between an old and a new program image or permitting an immediate rollback mode to a previous image.

As shown in FIG. 1, the SoC 110 may include a processing unit 112, a memory unit 114, a tamper detection module (TDM) 116, and a fault collection unit FCU 124. These units may be interconnected, e.g., via a system bus (not shown) or by dedicated direct connections (not shown). The SoC 110 may further include a configuration unit 118 for configuring the tamper detection module 116, e.g., during a boot phase of the SoC 110. The memory unit 114 may include one or more modules of different types. In other words, the memory unit 114 may represent a collection of one or more memory modules. These may be arranged in a single unit or be dispersed across the SoC. The entire memory unit 114 or selected regions thereof may be implemented as flash memory, for example. The memory unit 114 includes at least a log region 120a and a program region 120b. It may include further regions, e.g., a general purpose region 120c. The log region 120a can provide a log or diary for recording events that occur in the SoC 110 or that are signaled to the SoC. The program region 120b can provide program code accessible to the processing unit 112. The program code may include executable instructions as well as data.

Figure 2:
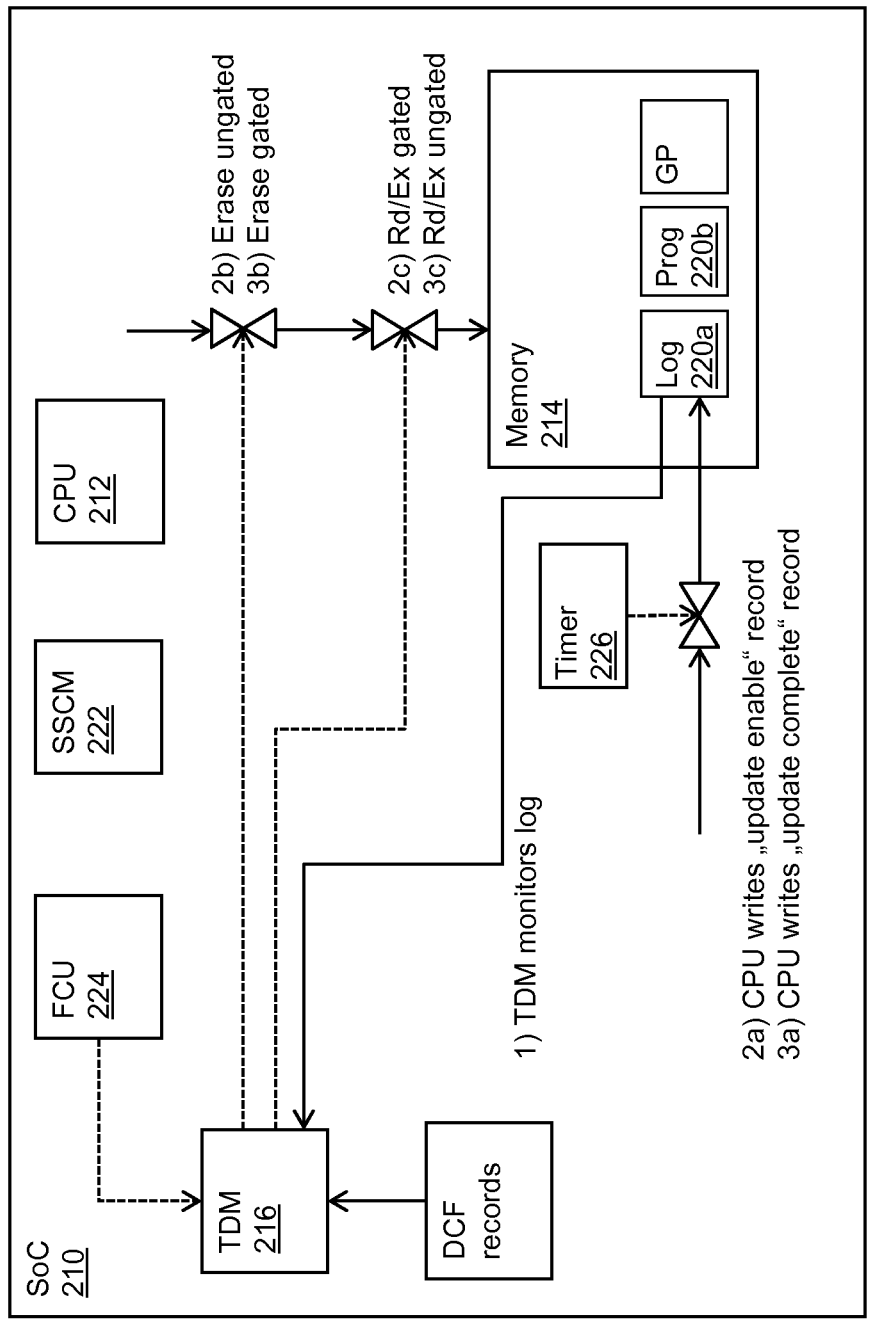
FIG. 2 schematically shows an example of a second embodiment of an SoC.

Turning now to FIG. 2, an example of an improved embodiment of an SoC 210 is described. The SoC 210 may include the features of the SoC 110 described above with reference to FIG. 1 and additional features for reducing risks associated with updates. More specifically, the SoC 210 may include a mechanism for enabling a user, e.g., an original equipment manufacturer (OEM), to verify that a clean NVM update has been made with no anomalies occurring during the time of the update. Furthermore, the mechanism can reduce a risk that a set of instructions and data installed in a non-clean update will be executed or used on the SoC. When the set of instructions has been updated with no anomalies occurring, the update can be validated in any suitable manner (e.g., by performing a cyclic redundancy check (CRC)). The mechanism ensures that a new image of program code loaded to the SoC 210 will not be executed or read until it has been stored in the NVM with no interruption or events taking place on the SoC that could have a negative effect upon NVM integrity (e.g., voltage anomalies, clock skews, memory errors, or program exceptions).

Figure 4:
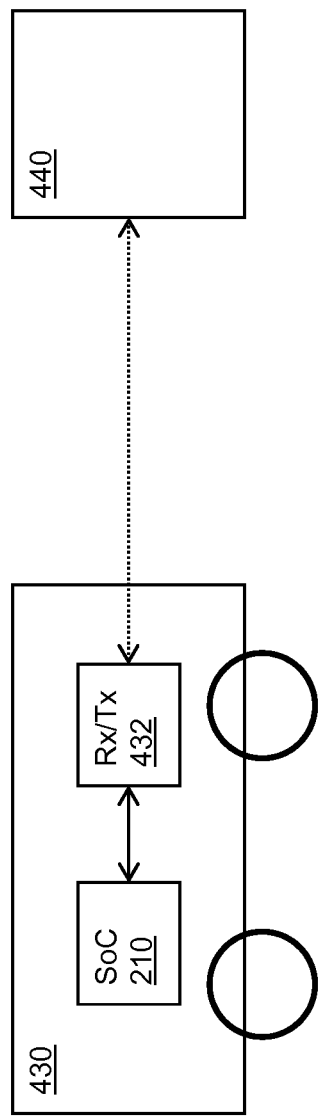
FIG. 4 schematically illustrates an example of an embodiment of a vehicle.

The SoC 210 may include a processing unit 212 for executing a program, a fault collection unit FCU 224 arranged to assert a fault flag in response to detecting a fault in the SoC 210, and a memory unit 214 including at least a program region 220b and a log region 220a. The processing unit may also be referred to as the central processing unit CPU. The SoC 210 may for instance be integrated in a vehicle 430 (see FIG. 4). The vehicle 430 may include an interface 432 for communicating with a remote server 440 by wireless communication, e.g., for receiving updates, e.g., from an OEM.

Figure 3:
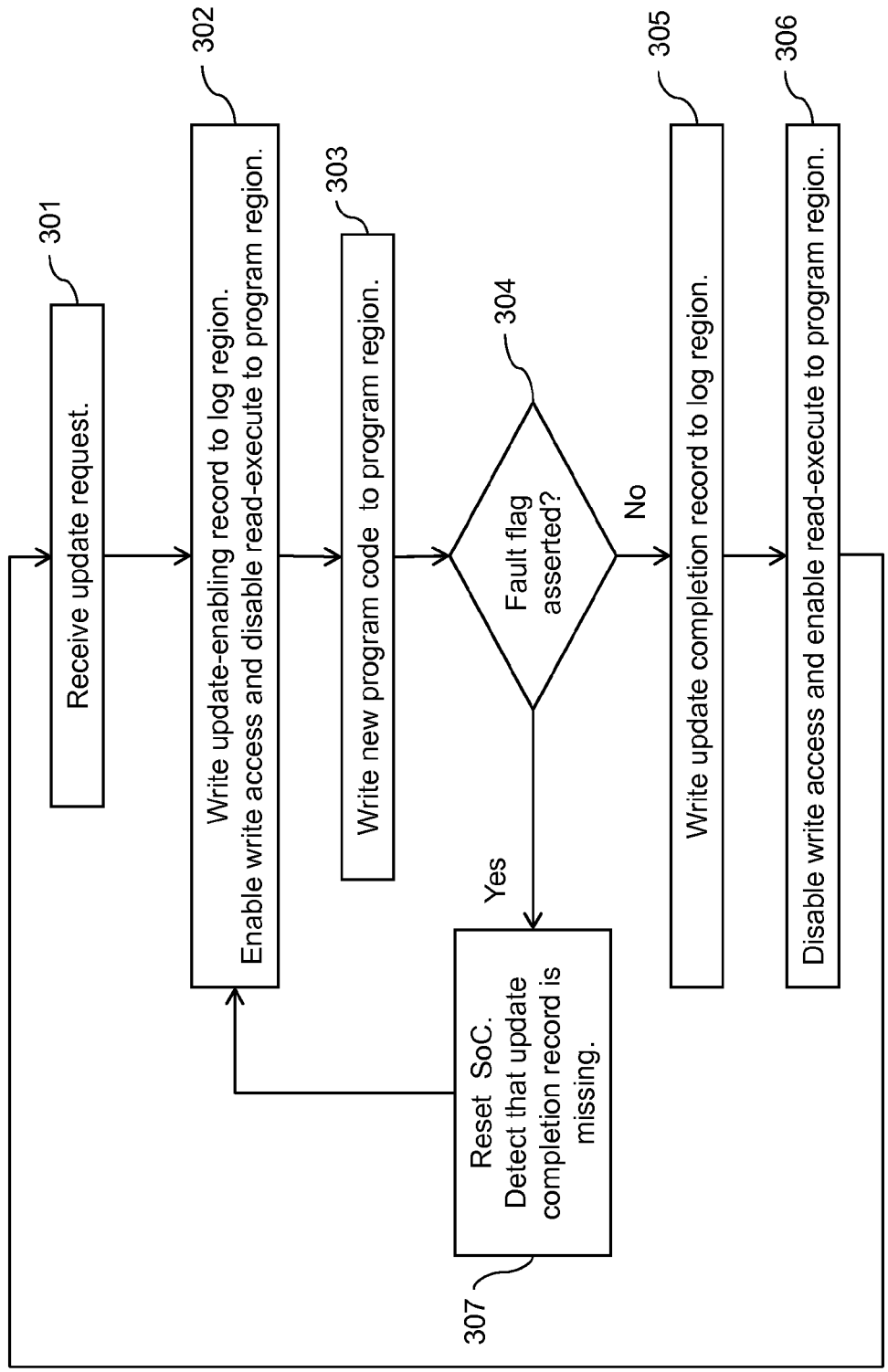
FIG. 3 shows a flowchart of an example of an embodiment of a method of updating program code on an SoC.

As schematically illustrated by the flowchart in FIG. 3, the SoC 210 may be arranged to perform an update enabling operation 302 in response to receiving or generating a request for updating program code 301, an update operation 303 when the update enabling operation has been completed, an update completion operation 305 when the update operation has been completed and the fault flag is low (i.e. not asserted), and a reinstatement operation 306 following the update completion operation. The update enabling operation 302 includes writing an update enabling record to the log region 220a, enabling write access to the program region 220b, and disabling at least one of read access and execute access to the program region 220b. The update operation 303 includes writing an image of program code to the program region 220b, thus updating program code on the SoC. The update operation 303 may further include or be followed by a decision operation 304 which includes determining a state of the fault flag. The update completion operation 305 includes writing an update completion record to the log region 220a. The update enabling record and the update completion record form a proof record. The reinstatement operation 306 includes detecting the proof record in the log and, in response thereto, disabling write access to the program region 220b and enabling read-and-execute access to the program region 220b. The SoC can thus return to a normal access mode for the program region 220b.

If, however, in the decision operation 304 the fault flag is high (i.e. asserted), i.e., when a fault has occurred somewhere on the SoC or when a fault has been signaled to the SoC, write access to the log region 220a will be restricted. Hence, the update completion record cannot be written in this case and at least one of read access and execute access to the program region 220b will remain restricted, too. In this case, the SoC 210 may be reset to an initial state in a reset operation 307, e.g., so as to re-boot. The reset may be triggered automatically or by a user, e.g., when the user is informed that the update has failed. Re-booting may include detecting that the expected update completion record is missing in the log region 220a, i.e., detecting that the latest update enabling record has not been complemented with an update completion record. An update enabling record that has not been complemented with an update completion record may be referred to as an isolated update completion record or as an incomplete proof record. The update process may then be repeated.

In a first example, repeating the update process includes repeating the update enabling operation 302, i.e., the process flow may continue with operation 302 as shown. A new update enabling record may thus be written to the log region and the previous update enabling record may remain isolated, i.e. a corresponding update completion record is not written, thus providing lasting evidence of the failed update.

In a second example (not shown), no new update enabling record is written to the log region following the reset operation 307 in response to detecting that the log region contains an isolated update enabling record. The update enabling record from the failed update may thus serve as the update enabling record for the next update attempt. This may result in a saving of memory space. On the other hand, it may destroy evidence of updates which have not succeeded in a first attempt.

The SoC may thus be arranged to determine, in response to a reset of the SoC, whether a most recent update record in the log region 220a is an update enabling record or an update completion record. In one embodiment, the SoC is arranged to repeat the update operation, but not necessarily the update enabling operation, in response to determining that the most recent update record in the log region 220a is an update enabling record. In an alternative embodiment, the SoC may be arranged to repeat both the update enabling operating and the update operation in response to determining that the most recent update record in the log region is an update enabling record.

The log region 220a may be one-time programmable, thus making the update sequence robust against errors and tampering. The log region 220a and also the program region 220b may, for example, be located in a flash memory unit.

The SoC 210 may include a tamper detection module 216 arranged to prevent the update enabling operation 302 in response to detecting a tamper event, e.g., an attempt of installing unauthorized program code. A risk of faulty updates can thus be further reduced.

Program code located in the program region 220b of the memory unit 214 can be updated under control of, e.g., the CPU 212. For example, the CPU 212 may execute update firmware stored on the SoC 210, e.g., in OTP NVM. The SoC 210 can thus be prompted to perform the following NVM update sequence. In an update enabling phase, the CPU 212 may write an update enabling record, e.g., provided by the tamper detection module 216, to the log region 220a. This may permit erase access by the CPU 212 to the program region 220b. When the update enabling record has been written to the log region 220a, a logic unit, e.g., the TDM 216, may set system memory access protection (e.g., by means of a memory protection unit or in the memory unit 214 itself) to a mode that prohibits at least one of read access and execute access. For example, execute access may be prohibited for the CPU 212 and read access may be prohibited for all other master units possibly present in the SoC 210. Only CPU access to the program region 220b may then be available. A program image, e.g., received from a remote server via a wireless link, may then be written to the program region 220b, thus updating program code located in the program region 220b. When the program code has been updated, the CPU 212 can write an update completion record to the log region 220a. The successful completion of the update can thus be logged. Only when the latest update enabling record has been complemented with an update completion record, the memory access scheme can permit normal access to the program region 220b. In other words, it will be impossible for the CPU 212 to access the newly installed program code until the update completion record has been written to the log region 220a. The CPU 12 can thus even be prevented from verifying the newly stored program code.

If the FCU 224 signals a fault before the update completion record is written to the log region 220a, write access to the log region 220a will be restricted so that the update completion record cannot be written to the log region 220a. Accordingly, at least one of read access and execute access to the program region 220b will then be restricted, too, and it will be impossible for the CPU 212 to access the newly installed program code.

The FCU 224 may be connected to various components or nodes of the SoC 210 and arranged to monitor one or more observables such as voltage levels, current levels, or digital values of these components or nodes. For example, the FCU 224 may be arranged to compare the value of a status register or status bit of a certain component of the SoC 210 or a voltage level or a current level continuously or repeatedly, e.g., periodically, against an expected value, an expected voltage level, or expected current level, respectively. Alternatively or in addition, the FCU 224 may be connected to other functional units of the SoC which generate their own fault signals and provide them to the FCU 224.

In one embodiment, there may be a time window for the update completion record to be written to the log region 220a after the update request has been generated or received or after the update enabling record has been written. The time window may have a predefined finite length, e.g. between one second and one hour. For instance, the SoC 210 may include a timer 226 for providing the time window. In one embodiment, the timer 226 may be arranged to provide the time window in response to the request for updating program code. The timer 226, e.g., a clocked counter, can for example be arranged to start counting in response to writing of the update enabling record and to count up to a predefined number which marks the end of the time window, i.e., the end of the finite period in which the update completion record can be written. When the counter has reached its final value and no update completion record has been written to the log region 220a, this may indicate that the update operation has taken longer than expected, possibly due to a fault occurring during the update sequence. After timeout, it may be necessary to reset, e.g., to reboot the SoC 210, for allowing the update completion record to be written to the log region 220a.

Figure 5:
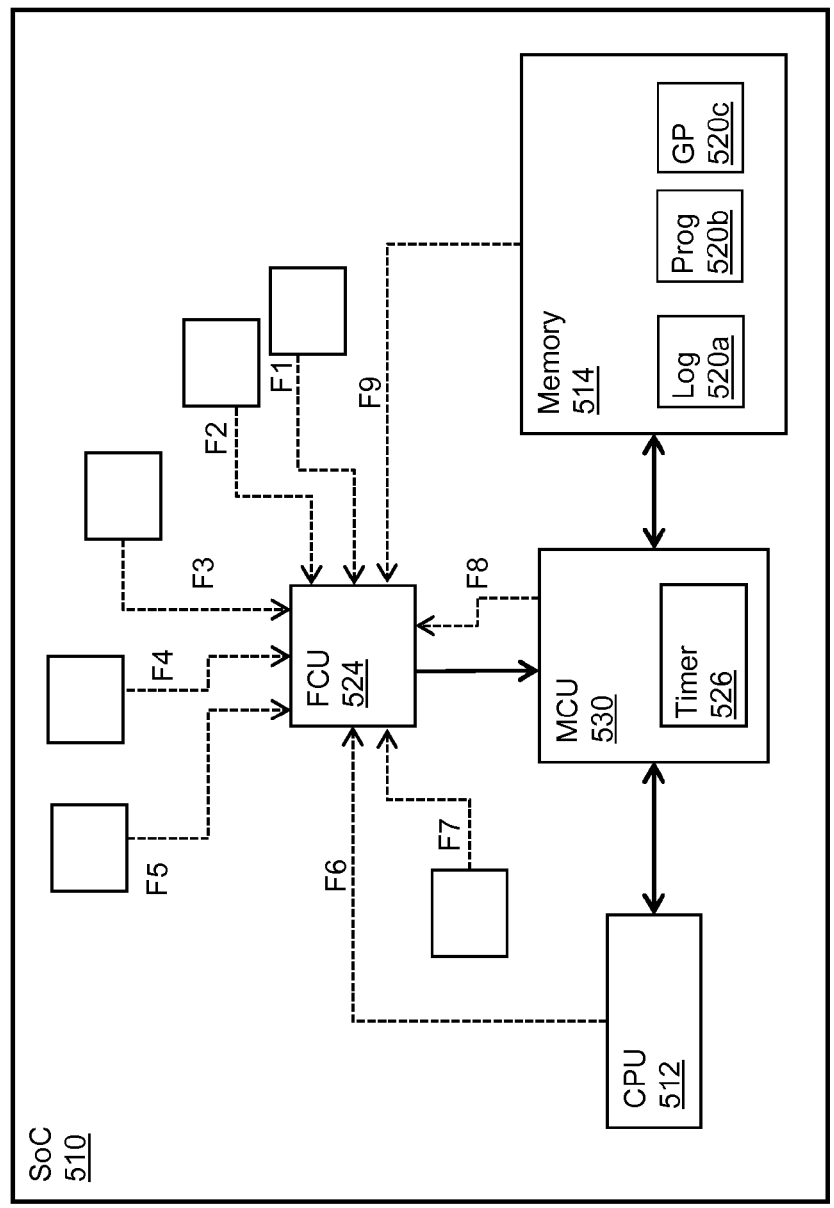
FIG. 5 schematically shows an example of a third embodiment of an SoC.

FIG. 5 schematically illustrates an example of an SoC 510 in which an update mechanism similar or identical to the one described above with reference to FIGS. 2 to 4 is implemented using a different arrangement of functional units. Every feature described above with reference to FIGS. 2 to 4 may be implemented equivalently in the SoC 510.

More specifically, the SoC 510 includes a processing unit 512 for executing program code and a memory unit 514. The memory unit 514 includes a program region 520b and a log region 520a. The memory unit 514 may comprise further regions, e.g., a general purpose region 520c. A memory control unit (MCU) 530 is connected between the memory unit 514 and the processing unit 512, for controlling access to the memory unit, e.g., for enabling and disabling selected types of access to selected memory regions.

The processing unit 512 can be arranged, e.g., by means of an operating system or by an update routine, to perform an update operation in response to an update request. The operating system or the update routine may, for example, be stored at least partly in the processing unit 512, or in the program region 520b, or in both, or elsewhere in the SoC. The update request may be a request received by the processing unit 512, e.g., from a remoter server. Alternatively, the update request may be generated by the processing unit 512 itself, e.g., in response to detecting that new program code is available on a remote server. The update operation includes appending an update enabling record to a sequence of update records in the log region 520a, writing new program code to the program region 520b, and appending an update completion record to the sequence of update records in the log region 520a. The sequence of update records has been referred to above as the log or diary. An example of a sequence of update records is illustrated in FIG. 6 and will be described further below.

The memory control unit 530 can be arranged to monitor the log region 520a, e.g., by periodically reading content of the log region 520a. The MCU 530 can further be arranged to enable write access to the program region 520b and to disable at least one of read access and execute access to the program region 520b when the last member of the sequence of update records in the log region 520a is an update enabling record. Conversely, the MCU 530 can be arranged to disable write access to the program region 520b and to enable at least one of read access and execute access to the program region when the last member of the sequence of update records is an update completion record. The MCU 530 can thus switch between an update access mode for allowing program code in the program region 520b to be updated by the processing unit 512 and a normal access mode in which the processing unit is able to read and execute program code residing in the program region 520b.

The SoC 510 further comprises a fault collection unit 524 arranged to assert a fault flag in response to a fault occurring in the SoC. The fault collection unit 524 may be arranged to operate independently from the processing unit 512. It may thus be immune against tampering or hacking attacks from the processing unit 512. In the example, the fault collection unit 524 is connected to several functional units of the SoC so as to receive a fault signal, e.g., one of the signals F1 to F9, from the respective functional unit. In other words, each of the functional units connected to the fault collection unit 524 is capable of signaling a fault to the fault collection unit 524. A fault may be a logical fault, e.g., the occurrence of an unexpected logical state, or a physical fault, e.g., a temperature or voltage being outside an expected range. When one of the signals F1 to F9 indicates a fault, the fault collection unit 524 asserts the fault flag. In one embodiment, the fault collection unit 524 may be arranged to deassert the fault flag only in response to a reset of the SoC 510, thus ensuring that the fault flag, if asserted, remains asserted until the next reset of the SoC. In another embodiment, the fault flag is deasserted in response to the next update request. This may enable a new update attempt without having to reset the SoC.

The memory control unit 530 may be connected to the fault collection unit 524 and arranged to disable write access to the log region 520a when the fault flag is asserted. The memory control unit 528 can thus be set to an access mode in which the processing unit 512 is unable to append an update completion record to the sequence of update records in the log region. Preferably, the log region 520a is one-time programmable. The log region can thus be immune against tampering or accidental loss of data. In particular, it can be ensured that a sequence of successful as well as unsuccessful update events can be tracked throughout the lifetime of the SoC 510. The log region 520a may, for instance, be located in a flash memory unit. The flash memory unit may comprise the memory unit 514 or a component thereof.

The processing unit 512 may be arranged, e.g., by means of an operating system or a boot routine, to generate a new program update request in response to a reset of the SoC if the last member of the sequence of update records is an update enabling record, i.e., if the most recent update record in the log region 520a is not complemented by an update completion record. A new attempt of updating the program code in the program region 520b can thus be initiated.

In one example, each update enabling record comprises a first constant which is the same for every update enabling record and each update completion record comprises a second constant which is the same for every update completion record and different from the first constant. The first constant and the second constant may, for example, be one and zero, respectively, or vice versa. In a particularly simple implementation, each update enabling record is one and each update completion record is zero, or vice versa. In other words, each update record may be a single bit which has the value one in the case of an update enabling record and zero in the case of an update completion record, or vice versa. The sequence of update records is a binary sequence in this case, bringing with it an important saving of memory in the log region 520 when compared to possible alternative implementations in which each update record is represented by more than one bit.

In another example, the processing unit is arranged to determine an update identifier associated with the update request and to include the update identifier in one or both of the update enabling record and the update completion record. The update identifier may, for example, be provided by a remote server to identify the update, and the processing unit may incorporate it into one or both of the update enabling record and the update completion record, e.g., for helping a system analyst to find out easily which updates were initiated and which have been completed.

A timer 526 may be connected to or integrated in the memory control unit 528. The timer 526 may be functionally similar or identical to timer 226. In particular, the timer 526 can be arranged to provide a time window for the processing unit to write an update completion record to the log region in response to a program update request. A risk of an update completion record being written accidentally or maliciously to the log region 520a can thus be reduced.

FIG. 6 illustrates, by way of example, a possible evolution of a sequence of update records residing in a log region 620a. The log region 620a may, for example, be one of the log regions 220a (see FIG. 2) and 520a (see FIG. 5). In the example, update enabling records are defined as "one" ("1" in the figure) and update completion records are defined as "zero" ("0" in the figure). At a first time t0, e.g., when the SoC is released from a factory, the log region 620a may be empty, i.e., the sequence of update records does not yet exist. In the scenario, successive update records 1, 0, 1, 1, 1, 1, 1, and 0 are written to the log region 620a, i.e., are appended to the sequence of update records, in response to successive update requests. Each "1" record represents an update enabling record and thus the beginning of an update operation. Each "0" record represents an update completion record and thus the completion of an update operation. For instance, an update completion record may be written when a cyclic redundancy checksum (CRC) has been computed for the new program code installed on the SoC and found to match a pre-computed checksum provided with the new program code. In the example, there are five successive update enabling records (each indicated as "1") and only the fifth of them is succeeded by an update completion record ("0"). Accordingly, there have been four successive unsuccessful update operations at times t3 to t6 and only a fifth update attempt (at time t7) has been successful as demonstrated by the update completion record "0" written to the log region at time t8.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the TDM, the SSCM, and the FCU may be integrated in the CPU.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. For example, the operations of enabling write access and disabling at least one of read access and execute access may be performed one after the other as well as overlapping in time.

Also for example, the examples, or portions thereof, may be implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The words "including" or "comprising" do not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system on chip (SoC), comprising:
multiple functional units;
a memory unit comprising a program region and a log region;
a processing unit for executing program code and arranged to perform an update operation in response to an update request received or generated by the processing unit, wherein the update operation comprises appending an update enabling record to a sequence of update records in the log region, writing new program code to the program region, and appending an update completion record to the sequence of update records in the log region;
a memory control unit connected between the memory unit and the processing unit, for controlling access to the memory unit; and
a fault collection unit arranged to assert a fault flag in response to a fault occurring in the SoC, wherein the multiple functional units are connected to the fault collection unit, each one of the multiple functional units configured to signal a fault of the respective functional unit to the fault collection unit;
wherein the memory control unit is further connected to the fault collection unit and arranged to disable write access to the log region in response to the fault flag being asserted.

2. The SoC of claim 1, wherein the fault collection unit is arranged to deassert the fault flag in response to a reset of the SoC.

3. The SoC of claim 1, wherein the fault collection unit is arranged to deassert the fault flag in response to a new update request.

4. The SoC of claim 1, wherein the log region is one-time programmable.

5. The SoC of claim 1, wherein the log region is located in a flash memory unit.

6. The SoC of claim 1, wherein the processing unit is arranged to generate a new program update request in response to a reset of the SoC if the last member of the sequence of update records is an update enabling record.

7. The SoC of claim 1, wherein each update enabling record comprises a first constant which is the same for every update enabling record and each update completion record comprises a second constant which is the same for every update completion record and different from the first constant.

8. The SoC of claim 1, comprising or connected to an interface for wireless communication between the processing unit and a remote server, for enabling the processing unit to receive said new program code from the remote server through said interface.

9. The SoC of claim 1, integrated in a vehicle.

10. A system on chip (SoC), comprising:
a tamper detection module arranged to detect tamper events;
a processing unit for executing program code;
a memory unit comprising a program region and a log region;
a memory control unit connected between the memory unit and the processing unit, for controlling access to the memory unit;
wherein the processing unit is arranged to perform an update operation in response to an update request received or generated by the processing unit, wherein the update operation comprises appending an update enabling record to a sequence of update records in the log region, writing new program code to the program region, and appending an update completion record to the sequence of update records in the log region,
wherein the memory control unit is arranged to monitor the log region and to enable write access to the program region and disable at least one of read access and execute access to the program region when the last member of the sequence of update records in the log region is an update enabling record, and to disable write access to the program region and enable at least one of read access and execute access to the program region when the last member of the sequence of update records is an update completion record, and
wherein the memory control unit is connected to the tamper detection module and arranged to disable write access to one or both of the program region and the log region in response to detection of a tamper event by the tamper detection module.

11. The SoC of claim 10, further comprising a fault collection unit arranged to assert a fault flag in response to a fault occurring in the SoC, wherein the memory control unit is connected to the fault collection unit and arranged to disable write access to the log region when the fault flag is asserted.

12. The SoC of claim 10, comprising a timer connected to or integrated in the memory control unit and arranged to provide a time window in response to the update request, wherein the memory control unit is arranged to disable write access to the log region for the processing unit in response to lapse of the time window.

13. The SoC of claim 10, comprising or connected to an interface for wireless communication between the processing unit and a remote server, for enabling the processing unit to receive said new program code from the remote server through said interface.

14. A method of operating a system on chip (SoC), wherein the SoC comprises:
a processing unit;
a memory unit comprising a program region and a log region;
a memory control unit connected between the memory unit and the processing unit, for controlling access to the memory unit;
and wherein the method comprises:
performing an update operation in response to an update request received or generated by the processing unit, wherein the update operation comprises appending an update enabling record to a sequence of update records in the log region, writing new program code to the program region, and appending an update completion record to the sequence of update records in the log region, asserting a fault flag in response to a fault occurring in the SoC;

disabling write access to the log region when the fault flag is asserted resetting the SoC;

determining whether the last member of the sequence of update records is an update enabling record; and generating a new program update request if the last member of the sequence of update records is an update enabling record.

15. The method of claim 14, comprising:

monitoring the log region;

enabling write access to the program region and disabling at least one of read access and execute access to the program region if the last member of the sequence of update records in the log region is an update enabling record; and disabling write access to the program region and enabling at least one of read access and execute access to the program region if the last member of the sequence of update records is an update completion record.

16. The method of claim 14, comprising one or more of:

deasserting the fault flag in response to a reset of the SoC; and deasserting the fault flag in response to the update request.

17. The method of claim 14, wherein each update enabling record comprises a first constant which is the same for every update enabling record and each update completion record comprises a second constant which is different from the first constant and which is the same for every update completion record.

* * * * *